(12) United States Patent
Tao et al.

(10) Patent No.: US 8,518,473 B2
(45) Date of Patent: Aug. 27, 2013

(54) NANOFILLED POLYMERIC NANOCOMPOSITES WITH TUNABLE INDEX OF REFRACTION

(75) Inventors: Peng Tao, Troy, NY (US); Yu Li, Fremont, CA (US); Brian Benicewicz, Columbia, SC (US); Richard W. Siegel, Menands, NY (US); Linda S. Schadler, Niskayuna, NY (US); Anand Viswanath, Columbia, SC (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 13/575,419

(22) PCT Filed: Jan. 27, 2011

(86) PCT No.: PCT/US2011/022743
§ 371 (c)(1),
(2), (4) Date: Jul. 26, 2012

(87) PCT Pub. No.: WO2011/094425
PCT Pub. Date: Aug. 4, 2011

(65) Prior Publication Data
US 2012/0302700 A1    Nov. 29, 2012

Related U.S. Application Data

(60) Provisional application No. 61/336,833, filed on Jan. 27, 2010.

(51) Int. Cl.
*C08K 9/04* (2006.01)
(52) U.S. Cl.
USPC .......................................... 427/162; 523/205

(58) Field of Classification Search
USPC .......................................... 427/162; 523/205
See application file for complete search history.

(56) References Cited

U.S. PATENT DOCUMENTS

2008/0255273 A1   10/2008   Pepe et al.
2009/0299003 A1 *  12/2009   Hawker et al. ................ 524/600

FOREIGN PATENT DOCUMENTS

| JP | 2007516314 A | 6/2007 |
| KR | 1020040023159 A | 3/2004 |
| WO | 2009153035 A1 | 12/2009 |

OTHER PUBLICATIONS

International Search Report and Written Opinion for PCT/US2011/022743 mailed Nov. 1, 2011.

* cited by examiner

*Primary Examiner* — Peter Szekely
(74) *Attorney, Agent, or Firm* — Heslin Rothenberg Farley & Mesiti P.C.

(57) ABSTRACT

The present invention includes a method for preparing a nanoparticle filled nanocomposite material, the method including the steps of providing a plurality of nanoparticles, attaching a first layer of organic ligand to the nanoparticle via a phosphate or phosphonate linkage, covalently attaching a second layer of matrix compatible polymer to said first layer of organic ligand to produce modified nanoparticles, providing a polymer matrix and dispersing the modified nanoparticles in the polymer matrix, wherein the dispersement of the modified nanoparticles into the polymer matrix results in a nanocomposite material, and wherein the modified nanoparticles are modified such that the first layer is proximal to the nanoparticle and the second layer is distal to the nanoparticle. Also within the scope of the invention are modified nanoparticles, alternative nanocomposite materials and methods of making the same.

29 Claims, 3 Drawing Sheets

NANOFILLED POLYMERIC NANOCOMPOSITES WITH TUNABLE INDEX OF REFRACTION

CROSS-REFERENCE TO RELATED APPLICATIONS

This application is a U.S. National Phase filing under 35 U.S.C. §371 of International Application PCT/US2011/022743, filed Jan. 27, 2011, and published as WO 2011/094425 on Aug. 4, 2011. PCT/US2011/022743 claimed benefit of priority under 35 U.S.C. §119 to United States Provisional Application No. 61/336,833, filed Jan. 27, 2010. The entire contents of each of the prior applications are herein incorporated by reference in their entireties.

GOVERNMENT RIGHTS STATEMENT

The U.S. Government has a paid-up license in this invention and the right in limited circumstances to require the patent owner to license others on reasonable terms as provided for by the terms of Grant No. EEC-0812056 awarded by the National Science Foundation (NSF). The U.S. Government has certain rights in the invention.

BACKGROUND OF THE INVENTION

1. Technical Field

The present invention generally relates to nanoparticles, and more particularly to nanoparticle-filled nanocomposites.

2. Background Information

Nanoparticles are gaining considerable interest for a wide variety of applications in the electronic, chemical, optical and mechanical industries due to their unique physical and chemical properties. Nanoparticles can be made of a variety of materials and are typically defined as particles having a diameter of 1-100 nanometers. Recently, the modification of nanoparticles in order to change their physical and chemical properties has become an area of significant research.

One way to modify nanoparticles is through reversible addition-fragmentation chain transfer (RAFT) polymerization. RAFT polymerization is a recently developed controlled rapid polymerization (CRP) technique that is used to prepare polymer materials with predetermined molecular weights, narrow polydispersities, and advanced architectures. RAFT has been used to surface modify nanoparticles with a bound polymer in order to minimize steric crowding between nanoparticles and impart superior dispersion characteristics to modified particles.

Click chemistry is a chemical technique whereby chemical compounds (often polymers) are generated by joining small repeated units together, usually by a dipolar cycloaddition. Click chemistry has been used for surface modification of nanoparticles with high density polymer brushes.

Optics is one of many disciplines where nanoparticles have been applied. Specifically, investigators have tried to use nanoparticles to improve upon certain optical characteristics of nanocomposite materials. However, previous technologies, such as nanoparticle modification through the use of surfactants, were limited in their ability to create high refractive index, high transmission nanocomposites. Several problems plague these technologies including problems with agglomeration, increased scattering, and increased optical loss.

SUMMARY OF THE INVENTION

In one aspect, the invention includes a method for preparing a nanoparticle filled nanocomposite material, the method including the steps of providing a plurality of nanoparticles, attaching a first layer of organic ligand to the nanoparticle via a phosphate or phosphonate linkage, covalently attaching a second layer of matrix compatible polymer to said first layer of organic ligand to produce modified nanoparticles, providing a polymer matrix and dispersing the modified nanoparticles in the polymer matrix, wherein the dispersement of the modified nanoparticles into the polymer matrix results in a nanocomposite material, and wherein the modified nanoparticles are modified such that the first layer is proximal to the nanoparticle and the second layer is distal to the nanoparticle.

In a second aspect, the invention includes a modified nanoparticle, including a nanoparticle, an organic ligand layer attached to the nanoparticle via a phosphate or phosphonate linkage, and a polymer covalently attached to said organic ligand layer; wherein said polymer layer has a molecular weight of greater than 1000, and wherein at least one of said organic ligand layer and said polymer layer comprises repeating units having an azide, acetylene or triazole side chain.

In a third aspect, the invention includes a method for preparing a nanoparticle filled nanocomposite material, the method including the steps of providing an organic ligand, covalently attaching a matrix compatible polymer to the organic ligand to form a surface ligand, providing a plurality of nanoparticles, attaching the surface ligand via a phosphate or phosphonate linkage to the nanoparticles to produce modified nanoparticles, providing a polymer matrix, and dispersing the modified nanoparticles in the polymer matrix, wherein the dispersement of the modified nanoparticles into the polymer matrix results in a nanocomposite material.

These, and other objects, features and advantages of this invention will become apparent from the following detailed description of the various aspects of the invention taken in conjunction with the accompanying examples.

DETAILED DESCRIPTION OF THE INVENTION

Figure 1:
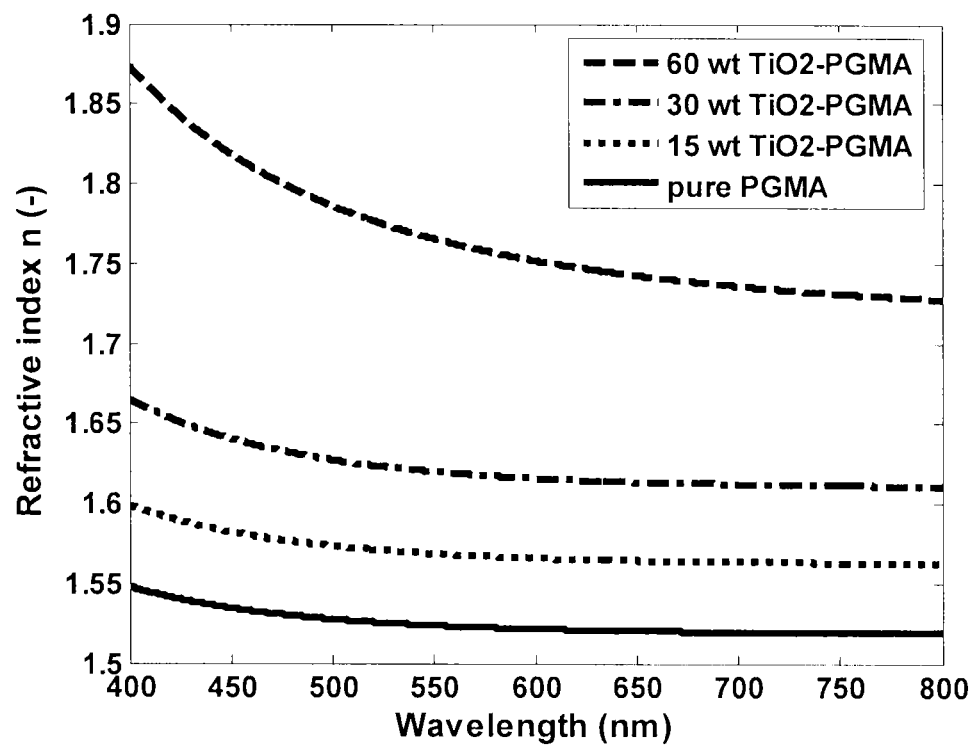
FIG. 1 shows a graph illustrating the effect of varying loading fractions of PGMA-modified titanium dioxide nanoparticles on the refractive index of a nanocomposite material.

The present invention provides for modified nanoparticles, nanocomposites, and methods of making modified nanoparticles and nanocomposites. The following description is intended to provide examples of the invention and to explain how various aspects of the invention relate to each other. However, it is important to note that the scope of the invention is fully set out in the claims and this description should not be read as limiting those claims.

In one aspect, the invention includes a method for preparing a nanoparticle filled nanocomposite material, the method including the steps of providing a plurality of nanoparticles, attaching a first layer of organic ligand to the nanoparticle via a phosphate or phosphonate linkage, covalently attaching a second layer of matrix compatible polymer to said first layer of organic ligand to produce modified nanoparticles, providing a polymer matrix and dispersing the modified nanoparticles in the polymer matrix, wherein the dispersement of the modified nanoparticles into the polymer matrix results in a nanocomposite material, and wherein the modified nanoparticles are modified such that the first layer is proximal to the nanoparticle and the second layer is distal to the nanoparticle.

Suitable nanoparticles may be made from any desired material. By way of example, nanoparticles suitable for use in the invention may be made from any of the following, including, but not limited to, inorganic particles, for example, metal oxides, such as, for example, titanium dioxide, barium titanate, zirconium dioxide, silica, aluminum oxide, indium tin oxide. For the purposes of this disclosure, the term "nanoparticle" is used in a broad sense, though for illustrative purposes only, some typical attributes of nanoparticles suitable for use in this invention are a particle size of between 1-50 nanometers and, with regards to particle shape, an aspect ratio of between 1 and 10.

Attachment of the organic ligand to the nanoparticle can be achieved in any reaction such that a bond between the nanoparticle and the organic ligand results, for example, a covalent bond. Several non-limiting examples of acceptable attachment/functionalization reactions are found in examples 1-5 below. Materials suitable for use in the practice of the invention include, but are not limited to: 1) ligands containing either a phosphate or phosphonate group and at least one of an azide, an alkyne, and a triazole, and 2) polymerization initiators such as dithioester or trithiocarbonate groups or atom transfer radical polymerization (ATRP) initiators. Aspects of the invention can have varying graft densities of organic ligands and/or matrix compatible polymers attached to the nanoparticles. Graft densities within the scope of aspects of the invention include, but are not limited to, 0.01 to 1.0 chains/nm$^2$ as measured by ultravioletvisible-absorption spectroscopy. Attachment of the organic ligand to the nanoparticles may be accomplished in multiple ways, including, for example, via "grafting from" or "grafting to" reactions. Below is a schematic of the grafting from and grafting to reactions:

Click reactions are one suitable class of reactions that may be used to attach matrix compatible polymers to the organic ligand. While any form of click chemistry is within the scope of the invention, an example is the use of azide-alkyne click chemistry, with a more specific example being the copper catalyzed variant of the Huisgen dipolar cycloaddition reaction. There are two major methods for producing functionalized polymers using click chemistry and both methods are included in the scope of the invention without limiting the invention to those two methods. The first major method includes use of a RAFT agent containing an azide or alkyne moiety to mediate the growth of various ligands. The resulting ligands contain terminal alkynyl or azido functionalities, which are then used in click reactions with functional azides or alkynes, respectively. This method can also be used to synthesize block copolymers by cojoining azide and alkyne end-functionalized polymer pairs, or to synthesize other structures such as the organic ligand/polymer linking present in the examples found elsewhere in this disclosure. The second method employs an organic ligand with pendant alkynyl or azido groups synthesized via RAFT. These ligands are then side-functionalized via click-reactions.

The term "compatible" as used herein means that the matrix compatible polymer is chemically similar enough to the polymer matrix that the dispersion of the nanoparticle meets at least one of the following criteria: a) the largest agglomerates of modified nanoparticles in the polymer matrix after dispersion and mixing are 500 nm in diameter and at least 50% of the agglomerates have a diameter less than 250 nanometers, b) the largest agglomerates of modified nanoparticles in the polymer matrix after dispersion and mixing are 100 nanometers in diameter and no more than 50% of the agglomerates are 100 nanometers in diameter, or c) at least 50% of the modified nanoparticles are individually dispersed in the polymer matrix after dispersion and mixing.

In particular embodiments of the invention, the matrix compatible polymer and the polymeric matrix will have identical chemical functionalities, for example, when they are

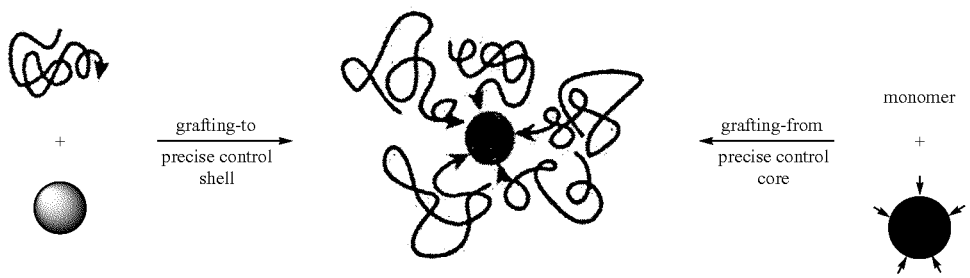

A variety of polymerization reactions are contemplated as within the scope of the present invention, including reversible addition-fragmentation chain transfer (RAFT) polymerization. RAFT reactions are performed under mild conditions, typically do not require a catalyst, and are applicable to a wide range of materials. Although several approaches employing RAFT techniques are within the scope of the invention, an example of one particular RAFT reaction is surface-initiated RAFT. Surface-initiated RAFT is particularly attractive due to its ability to provide precise control over the structure of the grafted polymer chains and provide significant control over the graft density as well. The matrix compatible polymer can be attached to the organic ligand via any suitable chemical reaction such that the organic ligand is covalently bonded to the matrix compatible polymer.

each of the same chemical class. Non-limiting examples of such chemical classes that are within the scope of the invention include, but are not limited to an epoxide/ether, an ester, an aliphatic hydrocarbon, a silicone, an aromatic hydrocarbon, a phenol/resole, an amide, an isocyanate/urethane, and a nitrile. More specific examples include, but are not limited to, poly (glycidyl methacrylate), poly (methyl methacrylate), polystyrene, and polydimethylsiloxane.

The term "chemical functionality" is interchangeable with "functional group" and would be readily understood by the person of skill in the art. The term is used in its normal sense, as defined in the *Dictionary of Science and Technology* (Academic Press 1992): "In a carbon-hydrogen molecule [a functional group is] an atom or group of atoms replacing a hydrogen atom; [it may also be] a reactive group having specific properties, such as a double bond." In the context used herein to describe the relationship between the matrix compatible polymer and the polymeric matrix, for example, the matrix may arise from polymerization of an epoxide, and the matrix compatible polymer will then possess the epoxide functionality in its side chain. In similar fashion, the resin/matrix may be a polyester, and the matrix compatible polymer will possess the carboxylic ester functionality in its side chain; or the resin/matrix may be a polyolefin, and the matrix compatible polymer will possess hydrocarbon functionality in its side chain.

Any suitable polymeric matrix can be used according to the invention, as desired. Non-limiting examples include: polyesters, vinyl esters, epoxies, phenols, polyimides, polyamides, polyethylene, polypropylene, polyether ether ketone, poly (methyl methacrylate), polystyrene, a silicone, or other thermoplastic, thermoset, or another application-appropriate polymer.

A variety of methods of dispersing the modified nanoparticles in the polymer matrix are within the scope of the invention. Non-limiting examples include 1) dissolving the matrix polymer and modified nanoparticles in a solvent and precipitating them from that solvent or casting the solution and evaporating the solvent; 2) mixing the modified nanoparticles in a melt (thermoplastic) and then allowing the mixture to cool and harden; 3) mixing the modified nanoparticles in an oligomer and then chemically crosslinking them (for example, in an epoxy); and 4) dispersing the modified nanoparticles in the polymer matrix while the matrix is still a monomer and then polymerizing the monomer to form a thermoplastic or a cross-linked polymer.

In a second aspect, the invention includes a modified nanoparticle, including a nanoparticle, an organic ligand layer attached to the nanoparticle via a phosphate or phosphonate linkage, and a polymer covalently attached to said organic ligand layer; wherein said polymer layer has a molecular weight of greater than 1000, and wherein at least one of said organic ligand layer and said polymer layer has an azide, acetylene or triazole side chain. The polymer may be a homopolymer.

Modified nanoparticles suitable for use in this aspect of the invention include all of the modified nanoparticles discussed elsewhere in this disclosure or other suitable application-specific nanoparticles. The nanoparticles may be inorganic nanoparticles, for example, titanium dioxide, barium titanate, zirconium dioxide, silica, aluminum oxide, or indium tin oxide.

Suitable organic ligands include, but are not limited to, 1) ligands containing either a phosphate or phosphonate group and at least one of an azide, an alkyne, and a triazole, and 2) polymerization initiators such as dithioester or trithiocarbonate groups or atom transfer radical polymerization (ATRP) initiators. Additional examples are found in the Examples section described elsewhere in this disclosure.

Suitable polymers according to this aspect of the invention include, but are not limited to, poly (glycidyl methacrylate), poly (methyl methacrylate), polystyrene, and polydimethylsiloxane. Additional appropriate polymers are described as matrix compatible polymers elsewhere in this disclosure.

Modified nanoparticles according to this aspect of the invention may be used in a variety of applications, including the nanocomposite materials in the present description. In such applications, the amount of modified nanoparticle present in a given embodiment of the invention, relative to the amount of polymeric matrix present, can vary as desired in an application-specific manner. A non-limiting example of amounts of modified nanoparticle typically present in various embodiments of the invention is a range where the modified nanoparticle loading fraction is between about 10 percent and about 80 percent.

In a third aspect, the invention includes a method for preparing a nanoparticle filled nanocomposite material, the method including the steps of providing an organic ligand, covalently attaching a matrix compatible polymer to the organic ligand to form a surface ligand, providing a plurality of nanoparticles, attaching the surface ligand via a phosphate or phosphonate linkage to the nanoparticles to produce modified nanoparticles, providing a polymer matrix, and dispersing the modified nanoparticles in the polymer matrix, wherein the dispersement of the modified nanoparticles into the polymer matrix results in a nanocomposite material.

Appropriate nanoparticles suitable for practice according to this aspect of the invention include all of the nanoparticles described in this disclosure as well as any other application-appropriate nanoparticle. Appropriate polymeric matrices also include those described elsewhere in this disclosure, for example, an epoxide/ether, an ester, an aliphatic hydrocarbon, a silicone, an aromatic hydrocarbon, a phenol/resole, an amide, an isocyanate/urethane, and a nitrile. More specific examples include, but are not limited to, poly (glycidyl methacrylate), poly (methyl methacrylate), polystyrene, and polydimethylsiloxane or another application-appropriate polymeric matrix.

As described for other aspects of the invention, suitable organic ligands include, but are not limited to 1) ligands containing either a phosphate or phosphonate group and at least one of an azide, an alkyne, and a triazole, and 2) polymerization initiators such as dithioester or trithiocarbonate groups or atom transfer radical polymerization (ATRP) initiators. Suitable matrix compatible polymers suitable for use in this aspect of the invention include, but are not limited to, poly (glycidyl methacrylate), poly (methyl methacrylate), polystyrene, and polydimethylsiloxane. Acceptable organic ligands and polymeric matrices are also described in other aspects of the invention found elsewhere in this disclosure. This aspect of the invention is also practicable with the RAFT and Click methodologies and the entirety of the discussion surrounding their use found elsewhere in this disclosure. Additionally, acceptable methods of dispersing the modified nanoparticles in the polymer matrix are as described elsewhere in this disclosure.

According to various aspects of the present invention, the use of different loading fractions of modified nanoparticles to affect one or more properties of the nanocomposite is contemplated. As an example, loading fractions of between about 10% to about 80% by weight of modified nanoparticles in a nanocomposite material may be used to affect the refractive index of the material. Specifically, in certain embodiments, increasing the loading fraction of modified nanoparticles may result in a progressively higher refractive index than the polymer matrix material alone would have, as indicated in FIG. 1. FIG. 1 shows the effect of different loading fractions of $TiO_2$ nanoparticles, modified with a PGMA polymer, on the refractive index of a PGMA matrix. The modified nanoparticles were made according to Example 3 below.

It is also contemplated as within the scope of the present invention that nanoparticles may be modified differently in order to tailor the effect of a particular loading fraction on the refractive index of the nanocomposite material, allowing for a desired modification of the refractive index of the nanocomposite material relative to the polymeric matrix material alone. For example, depending upon the specific modification to a particular nanoparticle, a 60% loading fraction may result in a nanocomposite according to aspects of the present invention having a higher refractive index or a lower refractive index than the polymer matrix material alone.

Tuning of the refractive index by varying the nanoparticles and modifications thereof, and/or by varying the loading fraction of the modified nanoparticles, is one example of how the present invention may be used to create desirable nanocomposite materials. Potential applications of tuning of the refractive index of a material include: light emitting diode (LED) packaging, light emitter (collector) management, manufacture of ophthalmic lenses, filters, optical adhesives, sensors, highly reflective and antireflective coatings, optical waveguide materials, volume holographic recording materials, and non-linear optical materials, among others.

Figure 2:
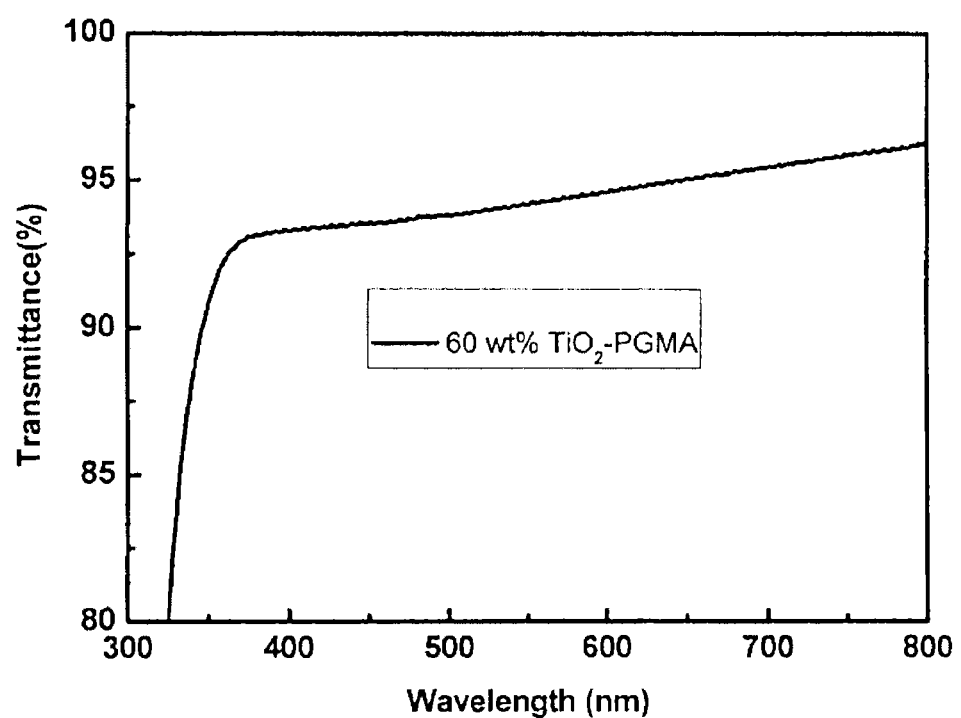
FIG. 2 depicts a graph showing the transparency of a nanocomposite material according to the present invention containing a 60% loading fraction of PGMA-modified titanium dioxide nanoparticles in an epoxy matrix.
Figure 3:
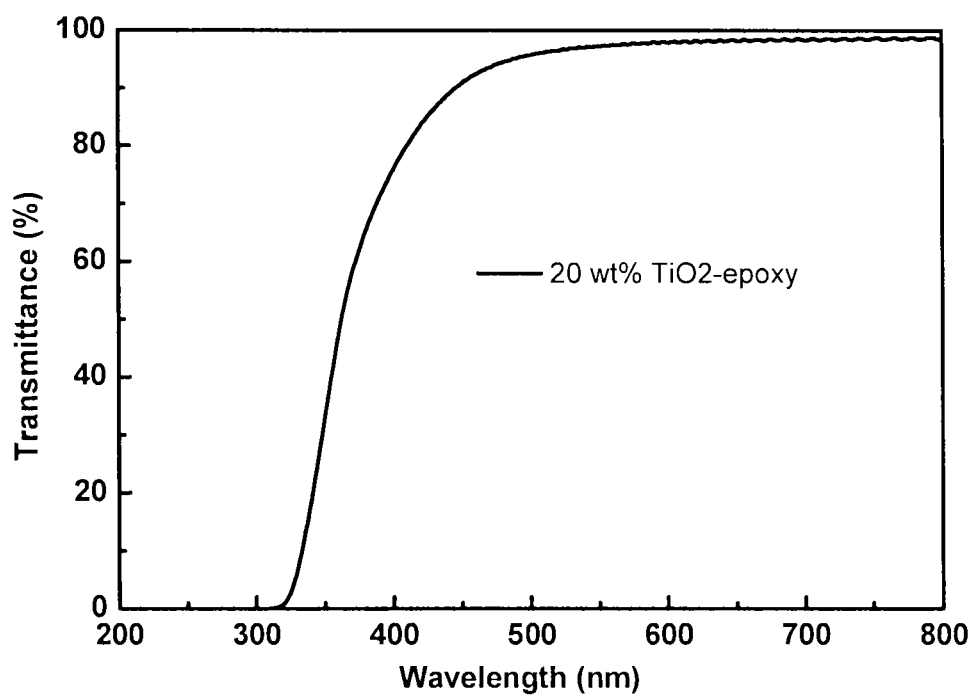
FIG. 3 presents a graph showing the transparency of a nanocomposite material according to the present invention containing a 20% loading fraction of PGMA-modified titanium dioxide nanoparticles in an epoxy matrix.

Another application of aspects of the current invention is to create materials with a tunable, high degree of transparency. Use of appropriate modified nanoparticles and controlled loading of those particles may result in materials with a very high degree of transparency. One example is found in the use of modified titanium dioxide nanoparticles, created according to Example 3 below. Use of a 60% loading fraction of these modified nanoparticles results in a nanocomposite material with a 90% or higher transparency over the whole visible light range as shown in FIG. 2. As another example, use of a 20% loading fraction of the epoxy-modified nanoparticles results in a nanocomposite material with a transparency of 70% or greater over the whole visible light range as shown in FIG. 3. In this aspect of the invention, the transparency of a nanocomposite material may be tuned by adding specific modified nanoparticles, by tailoring the loading fraction of modified nanoparticles, or both.

EXAMPLES

Explained herein are embodiments of the invention describing fabrication of transparent nanoparticle-filled nanocomposites with tunable optical properties, such as refractive index and color conversion. The invention may, however, be embodied in many different forms and should not be construed as being limited to the exemplary embodiments set forth herein; rather, these embodiments are provided so that this disclosure will be thorough and complete, and will convey the concept of the invention to those skilled in the art.

Example 1

In this example, a phosphonate coupling and click chemistry was used to graft poly(glycidyl methacrylate) (PGMA) chains onto zirconium dioxide ($ZrO_2$) nanoparticles to prepare transparent, high refractive index polymer nanocomposites.

The nanoparticle was modified with a phosphonate ligand which has a phosphonic acid head group binding strongly onto the surface of particles and an end group allows the grafting of polymer chains via a click reaction. A schematic chemistry is shown below:

Synthesis of 3-bromopropyl phosphonic acid

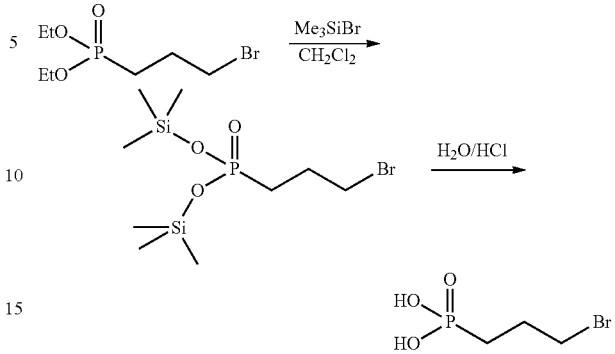

A 100 mL round-bottom flask was purged with argon. To the dry flask was added methane chloride (15 mL), diethyl (3-bromopropyl)phosphonate (2 mL, 9.9 mmol) and stirred with a magnetic stir bar. Trimethylsilyl bromide (6 mL, 45 mmol) was added into the flask via syringe. The argon gas was stopped and the mixture was stirred at room temperature for 24 h. HCl aqueous solution (5%, 10 mL) was added and stirred for 1 hour. The solution was extracted with $CH_2Cl_2$ (10 mL), dried with sodium sulfate overnight, and filtered. After the removal of the solvent by a rotoevaporator and under vacuum overnight, a yellow solid (1.75 g) was obtained.

Synthesis of $ZrO_2$ Nanoparticles $Zr(OPr)_4$ (1 mmol), oleic acid (5 mmol) and octadecane (6 mL) was stirred with a stir bar and heated to 310° C. in a 50 mL round-bottom flask. Oleylamine (4 mmol) was injected via a syringe into the flask and the reaction proceeded for another hour. After cooling to room temperature, the particles were collected by precipitating in ethanol and centrifugation. The obtained particles were dispersed in chloroform.

Functionalization of $ZrO_2$ Nanoparticles with Phosphonic Acid

Phosphonic acid was attached onto particle surface by refluxing the synthesized phosphonate with $ZrO_2$ particles with a 1:1 weight ratio in toluene at 90° C. overnight. The excess amount of ligand was removed by precipitating treated particles in methanol.

Azide Modification of $ZrO_2$ Nanoparticles

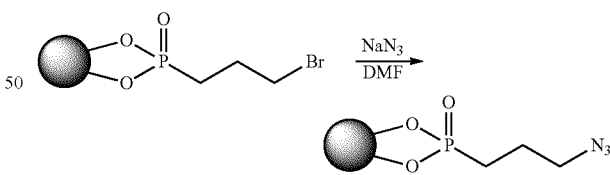

The phosphonic acid functionalized particles (1 g) were mixed with an excess amount of sodium azide (2 g) in DMF (40 mL) and stirred at room temperature for 24 h. After

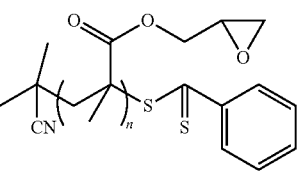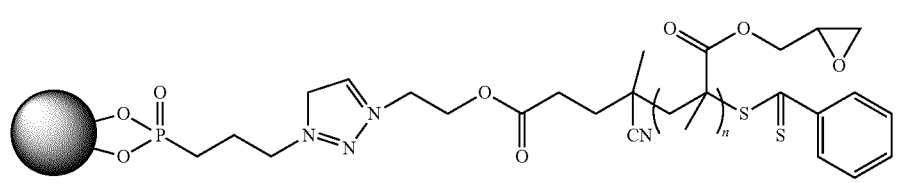

washing with water and centrifugation, the obtained particles were dispersed into tetrahydrofuran (THF) and ready for grafting polymers.

Synthesis of alkyne-terminated poly(glycidyl methacrylate) (PGMA)

Alkyne terminated poly(glycidyl methacrylate) (PGMA) was synthesized by reversible addition-fragmentation chain transfer polymerization (RAFT). A solution of glycidyl methacrylate (20 ml), THF (40 ml), prop-2-ynyl 4-cyano-4-(phenyl carbonothioylthio)pentanoate (100 mg), and azobisisobutyronitrile (AIBN) (5 mg) was prepared in a dried Schlenk tube. The mixture was degassed by three freeze-pump-thaw cycles, backfilled with nitrogen, and then placed in an oil bath at 60° C. overnight. The polymerization solution was quenched in ice water and precipitated in hexane. The polymer was recovered by centrifugation and dried under vacuum ($M_n$=20 Kg/mol, PDI=1.15).

Grafting Polymers onto $ZrO_2$ Nanoparticles

Phosphonic acid-azide ligand functionalized $ZrO_2$ particles (1 equiv of —$N_3$) were mixed with alkyne-terminated PGMA polymer (2 equiv), and N,N,N',N'',N''-pentamethyldiethylenetriamine (PMDETA) (0.5 equiv) was dissolved in TI-IF. The solution was degassed by bubbling nitrogen for 5 minutes and transferred to a flask containing CuBr (0.5 equiv) under a nitrogen atmosphere. The flask was transferred into an oil bath at 50° C. for 12 h. After the reaction, the solution was precipitated into methanol. The grafted particles were recovered by centrifugation and redispersed in chloroform.

Example 2

In this example, a phosphonate coupling and click chemistry was used to graft polystyrene chains onto $BaTiO_3$ nanoparticles.

The nanoparticle was modified with a phosphonate ligand which has a head group binding robustly onto the surface of particles and an end group that allows the grafting of polymer chains via a click reaction. A schematic chemistry is shown below:

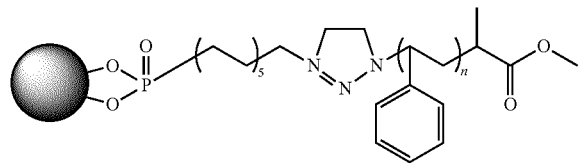

Synthesis of dodec-11-ynyl-phosphonic diethyl ester

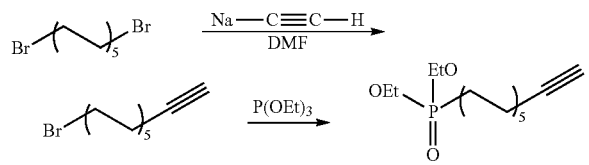

A 100 mL round-bottom dry flask was purged with Argon gas. Anhydrous DMF (20 mL) and 1,10-dibromdecane (7.5 g, 25 mmol) were mixed and stirred with a stir bar. Sodium acetylide (7.4 g, 18% wt in xylene) was added slowly. The mixture was stirred at 70° C. overnight. The reaction was quenched with DI water (40 ml). The solution was extracted with $CH_2Cl_2$ (3×50 mL), re-extracted with DI water (2×50 mL), dried with sodium sulfate overnight, and filtered. After the removal of the solvent by rotoevaporation, 12-bromo-dodec-1-yne (6.5 g) was obtained. The resultant product was added to triethyl phosphate (10.9 ml, 62.5 mmol) and stirred for 24 h at 150° C. After cooling to room temperature, the excess amount of triethyl phosphate was removed under vacuum. A light yellow liquid was obtained (1 g, 20%).

Synthesis of azide-terminated polystyrene

Polystyrene was prepared by ATRP ([Sty]/[MBP]/[CuBr]/[PMDETA]=100:1:1:1, 40 vol % toluene, 80° C.). Oxygen was removed by three freeze-pump-thaw cycles followed by backfilling with nitrogen. The polymerization was stopped by cooling and exposing the reaction mixture to air. The mixture was diluted with THF and passed through a neutral alumina column to remove the catalyst, and the polymer was isolated by precipitation into methanol. The bromo-terminated polymer (1 equiv) was reacted with $NaN_3$ (1.1 equiv) at room temperature in DMF (0.05 M-Br) to yield azido-terminated polystyrene.

Synthesis of $BaTiO_3$ Nanoparticles

Barium acetate (2.5 mmol) was dissolved in 7.5 mL DI water and mixed with NaOH solution (7 mL, 5 mol/L). $Ti(OBu)_4$ (1 mL) was dissolved in n-butanol (10 mL) and oleic acid (10 mL) was added and stirred with a magnetic stir bar for 5 minutes. The solution was transferred into a pressure vessel (50 mL, Parr) at 200° C. for 24 h. After decanting the supernaturant layer, the particles were collected by precipitating in ethanol and centrifugation. The obtained particles were dispersed into chloroform.

Functionalization of $BaTiO_3$ Nanoparticles with Phosphonate Ligand

Phosphonate ligand was attached onto the nanoparticle surface via sonication of the synthesized ligand with $BaTiO_3$ particles with a 1:1 weight ratio in chloroform for 30 min. The excess amount of ligand was removed by precipitating treated particles in ethanol. The functionalized particles were dispersed into THF ready for grafting polymer chains.

Grafting Polystyrene to $BaTiO_3$ Nanoparticles

Phosphonate functionalized $BaTiO_3$ particles (0.1 g) were mixed with azide-terminated polystyrene (0.1 g, 40 Kg/mol), and N,N,N',N'',N''-pentamethyldiethylenetriamine (PMDETA) (10 μL) was dissolved in THF. The solution was degassed by bubbling nitrogen for 5 minutes and transferred to a flask containing CuBr (5 mg) under a nitrogen atmosphere. The flask was transferred into an oil bath at 50° C. for 12 h. After the reaction, the solution was precipitated into methanol. The grafted particles were recovered by centrifugation and redispersed in chloroform.

Example 3

In this example, phosphate coupling combined with click chemistry was used to graft polymers on titanium dioxide ($TiO_2$) nanoparticles to prepare transparent, high refractive index polymer nanocomposites. The grafted poly(glycidyl methacrylate) (PGMA) polymer chains were prepared by reversible addition-fragmentation chain transfer polymerization (RAFT).

High refractive index $TiO_2$ nanoparticles were modified by a phosphate ligand featured by having a phosphate monoester head group, which can bind to the surface of $TiO_2$ nanoparticles and having an azide end group allowing for subsequent attachment of polymer chains via click chemistry. An example chemistry is shown in the schematic below:

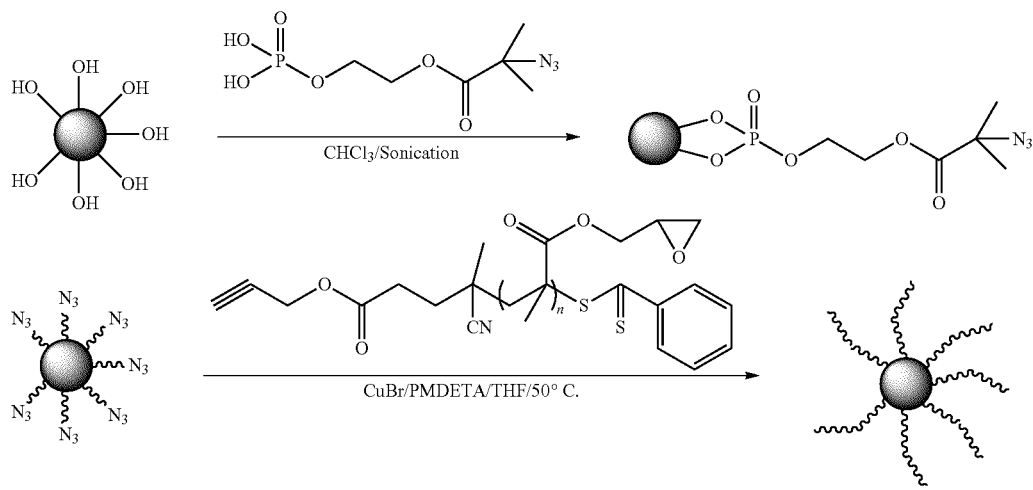

Synthesis of TiO₂ Nanoparticles

Oleic acid (10 mL), oleylamine (10 mL), cyclohexane (20 mL) and Ti(OBu)₄ (2 mL) were mixed at room temperature by magnetic stirring for 5 minutes. The solution was then transferred into a pressure vessel (50 mL, Parr) at 200° C. for 24 hours. After decanting the supernaturant layer, the particles were collected by precipitating in. ethanol and centrifugation. The obtained particles were dispersed into toluene.

Synthesis of alkyne-terminated poly(glycidyl methacrylate) (PGMA)

Alkyne terminated poly(glycidyl methacrylate) (PGMA) was synthesized by reversible addition-fragmentation chain transfer polymerization (RAFT). A solution of glycidyl methacrylate (20 mL), THF (40 mL), prop-2-ynyl 4-cyano-4-(phenyl carbonothioylthio)pentanoate (100 mg), and AIBN (5 mg) was prepared in a dried Schlenk tube. The mixture was degassed by three freeze-pump-thaw cycles, backfilled with nitrogen, and then placed in an oil bath at 60° C. for 22 h. The polymerization solution was quenched in ice water and precipitated in hexane. The polymer was recovered by centrifugation and dried under vacuum ($M_n$=40 000 g/mol, PDI=1.15).

Synthesis of 2-hydroxyethyl 2-bromo-2-methylpropanoate

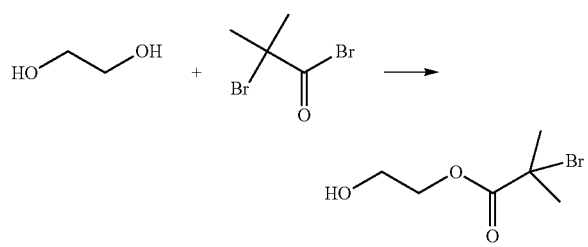

To a 250 mL round-bottom dry flask was added anhydrous ethylene glycol (55 mL, 1 mol). The flask was put into an ice bath and stirred with a magnetic stir bar. And then 2-bromoisobutyl bromide (5 mL, 40 mmol) was added dropwise into the flask. The solution was stirred for 3 hours and quenched with 25 mL DI water. The solution was extracted with CH₂Cl₂ (3×25 mL), dried with sodium sulfate overnight, and filtered. After the removal of the solvent by a rotoevaporator, 2-hydroxyethyl 2-bromo-2-methylpropanoate was obtained as a colorless liquid (yield: 8.2 g, 82.5%).

Synthesis of 2-(2-azido-2-methylpropanoyloxy)ethyl dihydrogen phosphate

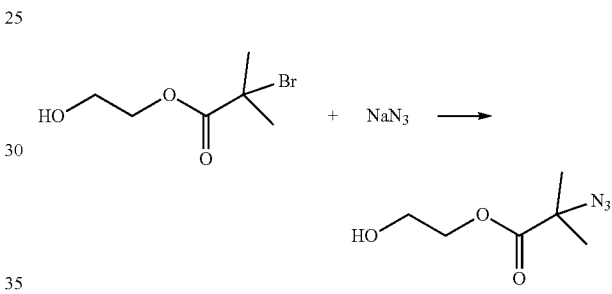

To a 250 mL round-bottom dry flask was added anhydrous DMF (60 mL), 2-hydroxyethyl 2-bromo-2-methylpropanoate (8.2 g, 38.8 mmol) and NaN₃ (2.7 g, 41.55 mmol). The solution was stirred with a magnetic bar for 24 hours at ambient temperature and quenched with DI water (80 mL). The solution was extracted with CH₂Cl₂ (3×50 mL), re-extracted with DI water (2×50 mL), dried with sodium sulfate overnight, and filtered. After the removal of the solvent by a rotoevaporator, a clear, colorless liquid (5.33 g, 88.8%) was obtained.

Synthesis of 2-(phosphonooxy)ethyl 2-azido-2-methylpropanoate

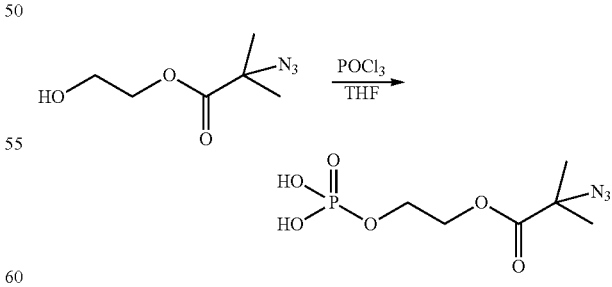

2-hydroxyethyl 2-azido-2-methylpropanoate (2 g, 11.54 mmol) was dissolved in anhydrous THF (40 mL) in a 250 ml round-bottom flask. Anhydrous triethylamine (1.8 mL, 12.7 mmol) was added into the flask and mixture was cooled to 0° C. with an ice bath. The solution was stirred with magnetic stir bar. POCl₃ (1.2 mL, 12.7 mmol) was added dropwise into the mixture. The reaction went for 5 hours and was quenched by adding DI water (40 mL). The solution was extracted with $CH_2Cl_2$ (3×35 mL), dried with sodium sulfate overnight, and filtered. After the removal of the solvent by a rotoevaporator and under vacuum overnight, a viscous, amber colored liquid (1.75 g, 60%) was obtained.

Functionalization of $TiO_2$ Nanoparticles with Phosphate Ligand

Phosphonic acid-azide ligand was attached onto particle surface via sonication of the synthesized ligand with titania particles with a 1:1 weight ratio in chloroform for 30 min. The excessive amount of ligand was removed by precipitating treated particles in ethanol. The functionalized particles were dispersed into THF ready for grafting polymer chains.

Grafting PGMA to $TiO_2$ Nanoparticles

Phosphoric acid-azide ligand functionalized $TiO_2$ particles (1 equiv of —$N_3$) were mixed with PGMA-alkyne polymer (2 equiv), and N,N,N',N'',N''-pentamethyldiethylenetriamine (PMDETA) (0.5 equiv) was dissolved in THF. The solution was degassed by bubbling nitrogen for 5 minutes and transferred to a flask containing CuBr (0.5 equiv) under a nitrogen atmosphere. The flask was transferred into an oil bath at 50° C. for 24 h. After the reaction, the solution was precipitated into methanol. The grafted particles were recovered by centrifugation and redispersed in chloroform.

Example 4

In this example, a phosphate coupling combined with click chemistry was used to graft poly(dimethyl siloxane) (PDMS) chains on barium titanate ($BaTiO_3$) nanoparticles to prepare transparent, high refractive index polymer nanocomposites. The PDMS grafted $BaTiO_3$ nanoparticles can be processed into transparent, high refractive index polymer composites, and they can also well-dispersed into silicone matrix.

High refractive index $BaTiO_3$ nanoparticles were modified by a phosphate ligand featured by having a phosphoric acid head group, which can bind to the surface of $BaTiO_3$ nanoparticles and having an azide end group allowing for subsequent attachment of polymer chains via click chemistry. An example chemistry is shown in the schematic below:

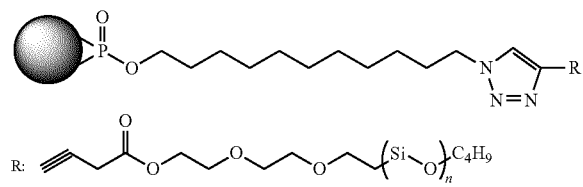

Synthesis of $BaTiO_3$ Nanoparticles

Barium acetate (2.5 mmol) was dissolved in 7.5 mL DI water and mixed with NaOH solution (7 mL, 5 mol/L). $Ti(OBu)_4$ (1 mL) was dissolved in n-butanol (10 mL) and oleic acid (10 mL) was added and stirred with magnetic stir bar for 5 minutes. The solution was transferred into a pressure vessel (50 mL, Parr) at 200° C. for 24 h. After decanting the supernaturant layer, the particles were collected by precipitating in ethanol and centrifugation. The obtained particles were dispersed into chloroform.

Synthesis of alkyne-terminated poly(dimethyl siloxane) (PDMS)

A solution of 4-pentynoic acid (196 mg, 2 mmol), monocarbinol functionalized poly (dimethyl siloxane) (PDMS from GELEST, Mw=10 Kg/mol, 2 g, 2 mmol) and 4-dimethylaminopyridine (DMAP) (73 mg, 0.6 mmol) in 50 mL of methylene chloride was cooled to 0° C. in a 250 ml round bottom flask. Dicyclohexylcarbodiimide (DCC) (412 mg, 2 mmol) was dissolved in 20 mL methylene chloride and added slowly to the solution. The resulting mixture was warmed to room temperature and stirred overnight. The precipitate was removed by filtration. The solution was washed twice with methanol and dried under vacuum overnight. Alkyane-terminated PDMS was obtained as a colorless liquid (1.6 g, 80%).

Synthesis of 11-azidoundecan-1-ol

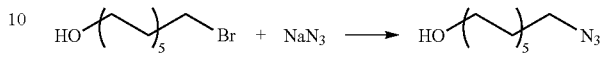

To a 250 mL round-bottom dry flask was added anhydrous DMF (60 mL), 11 bromo-1-undecanol (10 g, 39.8 mmol) and $NaN_3$ (2.85 g, 43.8 mmol). The solution was stirred with a magnetic bar for 24 hours at ambient temperature and quenched with DI water (60 mL). The solution was extracted with $CH_2Cl_2$ (3×40 mL), re-extracted with DI water (2×50 mL), dried with sodium sulfate overnight, and filtered. After the removal of the solvent by a rotoevaporator, a clear, colorless liquid (9.1 g, 93.4%) was obtained.

Synthesis of 11-azidoundecyl dihydrogen phosphate

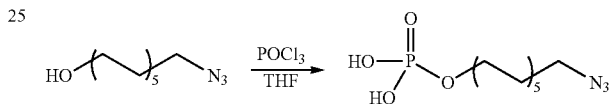

11-azido-undecan-1-ol (4.56 g, 20 mmol) was dissolved in anhydrous TI-IF (60 mL) in a 250 ml round-bottom flask. Anhydrous triethylamine (3.11 mL, 22 mmol) was added into the flask and mixture was cooled to 0° C. with an ice bath. The solution was stirred with a magnetic stir bar. $POCl_3$ (2.07 mL, 22 mmol) was added dropwise into the mixture. The reaction went for 5 hours and was quenched by adding DI water (40 mL). The solution was extracted with $CH_2Cl_2$ (3×30 mL), dried with sodium sulfate overnight, and filtered. After the removal of the solvent by a rotoevaporator and under vacuum overnight, a viscous, amber colored liquid (3.8 g, 75%) was obtained.

Functionalization of $BaTiO_3$ Nanoparticles with Phosphate Ligand

Phosphoric acid-azide ligand was attached onto particle surface via sonication of the synthesized ligand with $BaTiO_3$ particles with a 1:1 weight ratio in chloroform for 30 min. The excess amount of ligand was removed by precipitating treated particles in ethanol. The functionalized particles were dispersed into THF ready for grafting polymer chains.

Grafting PDMS to $BaTiO_3$ Nanoparticles

Phosphoric acid-azide ligand functionalized $BaTiO_3$ particles (1 equiv of —$N_3$) were mixed with PDMS-alkyne polymer (2 equiv), and N,N,N',N'',N''-pentamethyldiethylenetriamine (PMDETA) (0.5 equiv) was dissolved in THF. The solution was degassed by bubbling nitrogen for 5 minutes and transferred to a flask containing CuBr (0.5 equiv) under a nitrogen atmosphere. The flask was transferred into an oil bath at 50° C. for 12 h. After the reaction, the solution was precipitated into methanol. The grafted particles were recovered by centrifugation and redispersed in chloroform.

Example 5

In this example, reversible addition-fragmentation chain transfer (RAFT) polymerization was used to graft polymers on $TiO_2$ nanoparticles. 2-methyl-propionic acid 2-phosphoric acid-ethyl ester dithiobenzoate was used as the RAFT reaction agent.

The nanoparticles were modified with a phosphorate-RAFT ligand, in which the phosphoric acid group robustly anchors onto TiO$_2$ particles and RAFT agent functional group initiates the polymerization of poly(methyl metharylate) (PMMA). The grafted PMMA polymer chains have a grafting density of 0.7 chain/nm$^2$ and molecular weight of 40 Kg/mol. An example chemistry is shown in the schematic below:

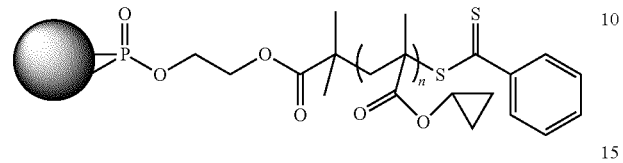

Synthesis of TiO$_2$ Nanoparticles

Oleic acid (10 mL), oleylamine (10 mL), cyclohexane (20 mL) and Ti(OBu)$_4$ (2 mL) were mixed at room temperature by magnetic stirring for 5 min. Then the solution was transferred into a pressure vessel (50 mL, Parr) at 200° C. for 24 h. After decanting the supernaturant layer, the particles were collected by precipitating in ethanol and centrifugation. The obtained particles were dispersed into chloroform.

Synthesis of 2-methyl-propionic acid 2-hydroxy-ethyl ester dithiobenzoate

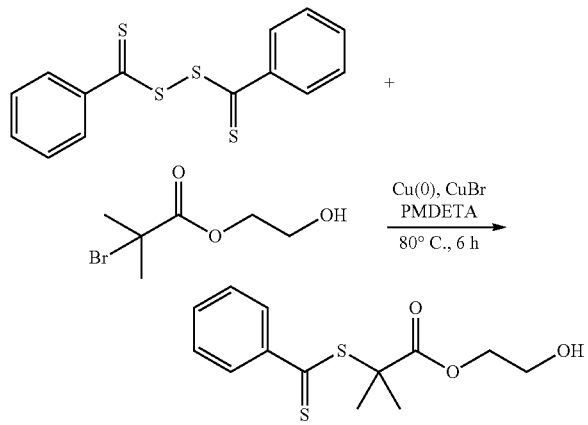

Dithiobenzoyl disulphide (92.75 mg, 0.3 mmol), CuBr (23.4 mg, 0.163 mmol) and Cu(0) (51.9 mg, 0.81 mmol) were added to a round bottom schlenk flask equipped with a magnetic stirrer. It was purged with N$_2$ for 20 min. In a separate schlenk flask, 2-bromo-2-methyl-propionic acid 2-hydroxy-ethyl ester (127.5 mg, 0.61 mmol), PMDETA (56.6 mg, 0.33 mmol) and anhydrous toluene (4 ml) was subjected to four cycles of freeze-pump-thaw. Using a syringe backfilled with N$_2$, the liquid contents were transferred to the other flask being purged. The mixture was then heated at 82° C. for 6 h. The mixture was then passed through a neutral alumina column to obtain the product in a 98% yield.

Synthesis of 2-methyl-propionic acid 2-phosphoric acid-ethyl ester dithiobenzoate (phosphate-RAFT)

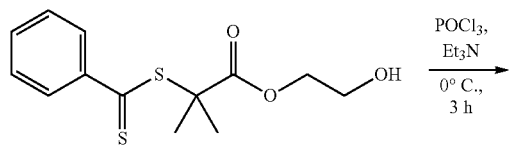

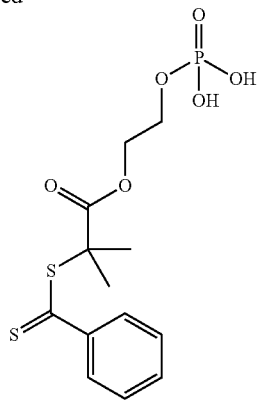

2-methyl-propionic acid 2-hydroxy-ethyl ester dithiobenzoate (0.466 g, 1.64 mmol) was dissolved in anhydrous THF (10 ml) in a 2-neck round bottom flask that was purged with N$_2$ for 10 min. The flask was equipped with a magnetic stirrer and rubber septa. Anhydrous triethylamine (0.183 g, 1.81 mmol) was added, and the mixture was cooled to 0° C. with an ice bath. POCl$_3$ (0.278 g, 1.81 mmol) was added slowly, dropwise to the solution. The reaction was allowed to warm up to room temperature and stirred for 3 h. The reaction was quenched with H$_2$O (10 ml) and the pH checked to be less than 2. It was extracted with CHCl$_3$ (3×10 ml), the combined organic extracts filtered over MgSO$_4$ and the solvent removed via rotary evaporation. The liquid was then dried under vacuum to give the product (0.354 g, 58%) as dark red oil.

Functionalization of TiO$_2$ Nanoparticles with Phosphate-Raft

Phosphate-RAFT ligand was attached onto particle surface via sonication of the synthesized ligand with titania particles with a 1:1 weight ratio in chloroform for 30 min. The excess amount of phosphate was removed by precipitating treated particles in ethanol. The functionalized particles were dispersed into THF.

Graft Polymerization of PMMA from Phosphate-Raft Anchored TiO$_2$ Nanoparticles

Phosphate-RAFT modified TiO$_2$ (0.075 g), methyl methacrylate (MMA) (0.9 g, 9 mmol), THF (1 ml) and AIBN (0.28 mg, 0.0017 mmol) were added to a schlenk tube equipped with a stirrer. The tube was subjected to three cycles of freeze-pump-thaw and was stirred for 4 h at 62.5° C. The polymerization was stopped by quenching the flask in ice water and the mixture precipitated in hexane to remove traces of monomer and solvent. The particles were centrifuged at 5000 rpm for 5 min and redispersed with THF.

While several aspects of the present invention have been described and depicted herein, alternative aspects may be effected by those skilled in the art to accomplish the same objectives. Accordingly, it is intended to cover all such alternative aspects as fall within the true spirit and scope of the invention.

The invention claimed is:

1. A method for preparing a nanoparticle filled nanocomposite material, the method comprising
   a. providing a plurality of nanoparticles;
   b. attaching a first layer of organic ligand to said nanoparticle via a phosphate or phosphonate linkage;
   c. covalently attaching a second layer of matrix compatible polymer to said first layer of organic ligand to produce modified nanoparticles;
   d. providing a polymer matrix;
   e. dispersing said modified nanoparticles in said polymer matrix, wherein the dispersement of said modified nanoparticles into said polymer matrix results in a nanocomposite material, and wherein said modified nanoparticles are modified such that said first layer is proximal to said nanoparticle and said second layer is distal to said nanoparticle.

2. The method of claim 1, wherein the nanoparticles are inorganic nanoparticles.

3. The method of claim 2, wherein the inorganic nanoparticles are titanium dioxide nanoparticles, zirconium dioxide nanoparticles, or barium titanate nanoparticles.

4. The method of claim 1, wherein the loading fraction of said modified nanoparticles in said nanocomposite material is between about 10% and about 80% by weight.

5. The method of claim 1, wherein the organic ligand contains either a phosphate or a phosphonate group and at least one of an azide, an alkyne, and a triazole.

6. The method of claim 1, wherein the second layer is selected from a group consisting of poly (glycidyl methylacrylate), poly (methyl methacrylate), polystyrene, and polydimethylsiloxane.

7. The method of claim 1, wherein the polymer matrix is either a thermoplastic or a thermoset.

8. The method of claim 7, wherein the polymer matrix is selected from a group consisting of poly (methyl methacrylate), polystyrene, an epoxy, and a silicone.

9. The method of claim 1, wherein the nanocomposite material has a higher refractive index than the polymer matrix alone.

10. The method of claim 1, wherein the nanocomposite material has a transparency of more than about 70% in the whole visible light range.

11. A modified nanoparticle comprising
   a. a nanoparticle;
   b. an organic ligand layer attached to said nanoparticle via a phosphate or phosphonate linkage; and
   c. a polymer covalently attached to said organic ligand layer; wherein said polymer layer has a molecular weight of greater than 1000, and wherein at least one of said organic ligand layer and said polymer layer has an azide, acetylene or triazole.

12. The modified nanoparticle of claim 11, wherein the nanoparticles are inorganic nanoparticles.

13. The modified nanoparticles of claim 12, wherein the inorganic nanoparticles are titanium dioxide nanoparticles, zirconium dioxide nanoparticles, or barium titanate nanoparticles.

14. The nanoparticle of claim 11, wherein the organic ligand contains either a phosphate or a phosphonate group and at least one of an azide, an alkyne, and a triazole.

15. The method of claim 11, wherein the polymer is selected from a group consisting of poly (glycidyl methylacrylate), poly (methyl methacrylate), polystyrene, and polydimethylsiloxane.

16. A method for preparing a nanoparticle filled nanocomposite material, the method comprising
   a. providing an organic ligand;
   b. covalently attaching a matrix compatible polymer to said organic ligand to form a surface ligand;
   c. providing a plurality of nanoparticles;
   d. attaching said surface ligand via a phosphate or phosphonate linkage to said nanoparticles to produce modified nanoparticles;
   e. providing a polymer matrix;
   f. dispersing said modified nanoparticles in said polymer matrix, wherein the dispersement of said modified nanoparticles into said polymer matrix results in a nanocomposite material.

17. The method of claim 16, wherein the nanoparticles are inorganic nanoparticles.

18. The method of claim 17, wherein the inorganic nanoparticles are titanium dioxide nanoparticles, zirconium dioxide nanoparticles, or barium titanate nanoparticles.

19. The method of claim 16, wherein the loading fraction of said modified nanoparticles in said nanocomposite material is between about 10% and about 80% by weight.

20. The method of claim 16, wherein the organic ligand contains either a phosphate or a phosphonate group and at least one of an azide, an alkyne, and a triazole.

21. The method of claim 16, wherein the matrix compatible polymer is selected from a group consisting of poly (glycidyl methylacrylate), poly (methyl methacrylate), polystyrene, and polydimethylsiloxane.

22. The method of claim 16, wherein the polymer matrix is a thermoplastic or a thermoset.

23. The method of claim 22, wherein the polymer matrix is selected from a group consisting of poly (methyl methacrylate), polystyrene, an epoxy, and a silicone.

24. The method of claim 16, wherein the nanocomposite material has a higher refractive index than the polymer matrix alone.

25. The method of claim 16, wherein the nanocomposite material has a transparency of more than about 70% in the whole visible light range.

26. A method for producing a composite material of predetermined refractive index comprising
   a. providing a polymer matrix,
   b. introducing into said matrix a modified nanoparticle to form a composite material, wherein the modified nanoparticle includes a nanoparticle, an organic ligand layer attached to said nanoparticle via a phosphate or phosphonate linkage, and a polymer covalently attached to said organic ligand layer;
      wherein said polymer layer has a molecular weight of greater than 1000, and
      wherein at least one of said organic ligand layer and said polymer layer has an azide, acetylene or triazole.

27. The method of claim 26, wherein a loading fraction of said modified nanoparticles in said polymer matrix is between about 10% and about 80% by weight.

28. The method of claim 26, wherein the composite material has a transparency of more than about 70% in the whole visible light range.

29. The method of claim 26, wherein said polymer matrix is a thermoplastic or a thermoset.

* * * * *